United States Patent
Takahashi

(10) Patent No.: US 7,620,271 B2
(45) Date of Patent: Nov. 17, 2009

(54) IMAGE PROCESSING APPARATUS AND METHOD OF CONTROLLING SAME, COMPUTER PROGRAM AND COMPUTER-READABLE STORAGE MEDIUM

(75) Inventor: Fumiaki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/046,145

(22) Filed: Mar. 11, 2008

(65) Prior Publication Data

US 2008/0159656 A1    Jul. 3, 2008

Related U.S. Application Data

(62) Division of application No. 11/049,967, filed on Feb. 4, 2005, now Pat. No. 7,356,204.

(30) Foreign Application Priority Data

Feb. 6, 2004  (JP)  ............... 2004-031402
Jan. 5, 2005  (JP)  ............... 2005-000909

(51) Int. Cl.
    *G06K 9/03*    (2006.01)

(52) U.S. Cl. ................................... 382/309

(58) Field of Classification Search ................. 382/254, 382/309; 707/E17.143
See application file for complete search history.

(56) References Cited

U.S. PATENT DOCUMENTS

| | | | |
|---|---|---|---|
| 5,235,914 A * | 8/1993 | Williams et al. | 101/467 |
| 5,719,624 A | 2/1998 | Sasaki et al. | 348/231 |
| 6,202,073 B1 | 3/2001 | Takahashi | 707/517 |
| 6,515,698 B1 | 2/2003 | Sasaki et al. | 348/213.6 |
| 6,549,681 B1 | 4/2003 | Takahashi et al. | 382/294 |

FOREIGN PATENT DOCUMENTS

JP            3-049483           3/1991

* cited by examiner

*Primary Examiner*—Andrew W Johns
*Assistant Examiner*—Gregory F Cunningham
(74) *Attorney, Agent, or Firm*—Fitzpatrick, Cella, Harper & Scinto

(57) ABSTRACT

The invention displays an image that conforms to an editing parameter set by the user and, depending upon the editing parameter requested, shortens the time required for the image to be displayed, thereby enhancing usability. To achieve this, the invention has a processing parameter input unit for inputting an editing-related parameter such as sharpness. If an image data file to be edited is read in from an image file storage unit, photographic condition information within the file is analyzed and the information obtained by analysis is compared with a parameter that has been set. If the two agree, then a display is presented based upon processed image data within the image file. If the two do not agree, then unprocessed image data within the same file is subjected to image processing in accordance with the set parameter and the processed image is displayed.

17 Claims, 10 Drawing Sheets

IMAGE PROCESSING APPARATUS AND METHOD OF CONTROLLING SAME, COMPUTER PROGRAM AND COMPUTER-READABLE STORAGE MEDIUM

RELATED APPLICATIONS

This application is a division of U.S. patent application Ser. No. 11/049,967, filed Feb. 4, 2005, which is incorporated by reference herein in entirety, as if fully set forth herein, and claims the benefit of priority under 35 U.S.C. § 119, based on Japanese Patent Application Nos. 2004-031402, filed Feb. 6, 2004, and 2005-000909, filed Jan. 5, 2005, which are incorporated by reference herein in their entirety, as if fully set forth herein.

FIELD OF THE INVENTION

This invention relates to a case where an information processing apparatus presently referred to in general as a personal computer is made to operate as an image processing apparatus. More particularly, the invention relates to an image processing apparatus for displaying the image content of a RAW image file in which image data, which has not undergone image processing, representing an image that has been captured by a digital camera and image data that is the result of application of image processing have been stored in one file as non-general-purpose data.

BACKGROUND OF THE INVENTION

In an image sensing apparatus such as a digital still camera, the output signal from an image sensing device such as a CCD sensor or CMOS sensor is subjected to an A/D conversion, the digital signal is subsequently subjected to various processing such as a white balance correction, JPEG compression is performed and the compressed data is recorded on a removable recording medium such as a memory card. Further, in a case where a sensed image is edited, generally this is performed by utilizing an image-editing application program that runs on a general-purpose information processing apparatus such as a personal computer.

JPEG compression is irreversible. Accordingly, the image (the decoded image) when it undergoes editing is different from the image that prevailed when it was sensed by the image sensing device and the nature of editing that can be applied naturally is limited. This is unsatisfactory for a user who possesses sophisticated editing know-how.

In this regard, there is prior art (e.g., see the specification of Japanese Patent Application Laid-Open No. 3-49483) applicable to an image sensing apparatus such as a digital still camera in which the output signal from the image sensing device is subjected to an A/D conversion, the resultant signal is subsequently subjected to reversible compression, based upon the TIFF format or a manufacturer-specific compression format, as digital image data (referred to as "raw image data" below) without being subjected to almost any image processing, and the raw image data, camera-specific attribute information (referred to as "image sensing device filter characteristics" below) signifying such characteristics of the color filter of the image sensing device as the pixel array, filter color array and sensitivity characteristic (spectral sensitivity, etc.) of each pixel, and photographic condition information that prevailed when the raw image data was captured are recorded in association with one another on a removable recording medium such as a memory card.

For example, in a case where processing is executed by a personal computer, raw image data is subjected to reproduction image processing (referred to as "development processing") based upon image sensing conditions associated with the raw image data as attribute information thereof, and the raw image data that has been developed is displayed on a monitor or the like. The application program performs reproduction by executing image processing such as pixel-by-pixel interpolation processing conforming to the image sensing device filter characteristics, color separation processing, white balance processing conforming to light-source information prevailing at the time of image sensing, luminance adjustment processing conforming to such photographic conditions as exposure time, shutter speed and zoom position, color adjustment processing and sharpness processing. In a case where an image thus reproduced is observed and the user wishes to set the white balance or color adjustment at will, development processing is executed again from the raw image data based upon the attribute information and image processing parameters.

In general, however, unprocessed image data such as raw image data is large in quantity because the output signal from the image sensor is held as is as image information, and development processing for effecting a conversion to data that can be displayed on a monitor or the like by the above-described application software requires a long processing time since many image processing steps are executed. For this reason, the state of the image represented by raw image data is not known until development processing is completed, the user must wait until processing is finished and the image displayed and hence there are problems in terms of the display speed of development processing and in terms of usability. That is, when raw image data is displayed in the normal display mode in the prior art, the display is presented after development processing is applied to the raw image data of the raw image file, and if the mode is made a high-speed preview mode (JPEG preview mode) by a mode changeover, what is displayed is always JPEG data, which is image data that has undergone development processing and is created at the time of photography. However, the following problems arise:

1) When the user has specified a development parameter different from the setting (photographic condition parameter) that prevailed at the time of photography, in the JPEG preview mode the JPEG data indicative of the content of development processing at the time of photography is always displayed and therefore the result of image processing based upon the parameter designated by the user cannot be verified.]
2) In order to check the result of processing based upon the parameter that has been designated by the user, it is required that the user switch the mode of the display to the normal display mode each time, resulting in poor usability.

SUMMARY OF THE INVENTION

Accordingly, an object of the present invention is to so arrange it that with regard to image data composed of unprocessed image data (raw image data) and image data that has undergone development processing, not only is an image conforming to an editing parameter designated by the user displayed but, depending upon the editing parameter requested, the time required until the image is displayed can be shortened and usability enhanced.

According to the present invention, the foregoing object is attained by providing an image processing apparatus for editing an image file constituted by at least photographic condition information, processed image information that has not undergone image processing in accordance with the photographic conditions and unprocessed image information that has undergone the image processing, the apparatus comprising: setting means for setting an editing parameter relating to image processing; comparison means for comparing the editing parameter that has been set by the setting means and an applicable parameter in the photographic condition information within the image file if an image file that has been stored in a prescribed storage device and is to be edited is displayed in accordance with a condition that has been set by the setting means; and image processing changeover means for displaying, on prescribed display means, an image that is based upon the processed image information within the image file to be edited if the parameters compared by the comparison means agree, and displaying, on the display means, an image that has been obtained by subjecting the unprocessed image information within the image file to be edited to image processing in accordance with the parameter that has been set by the setting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENTS

Embodiments according to the present invention will now be described in detail in accordance with the accompanying drawings.

First Embodiment

Figure 1:
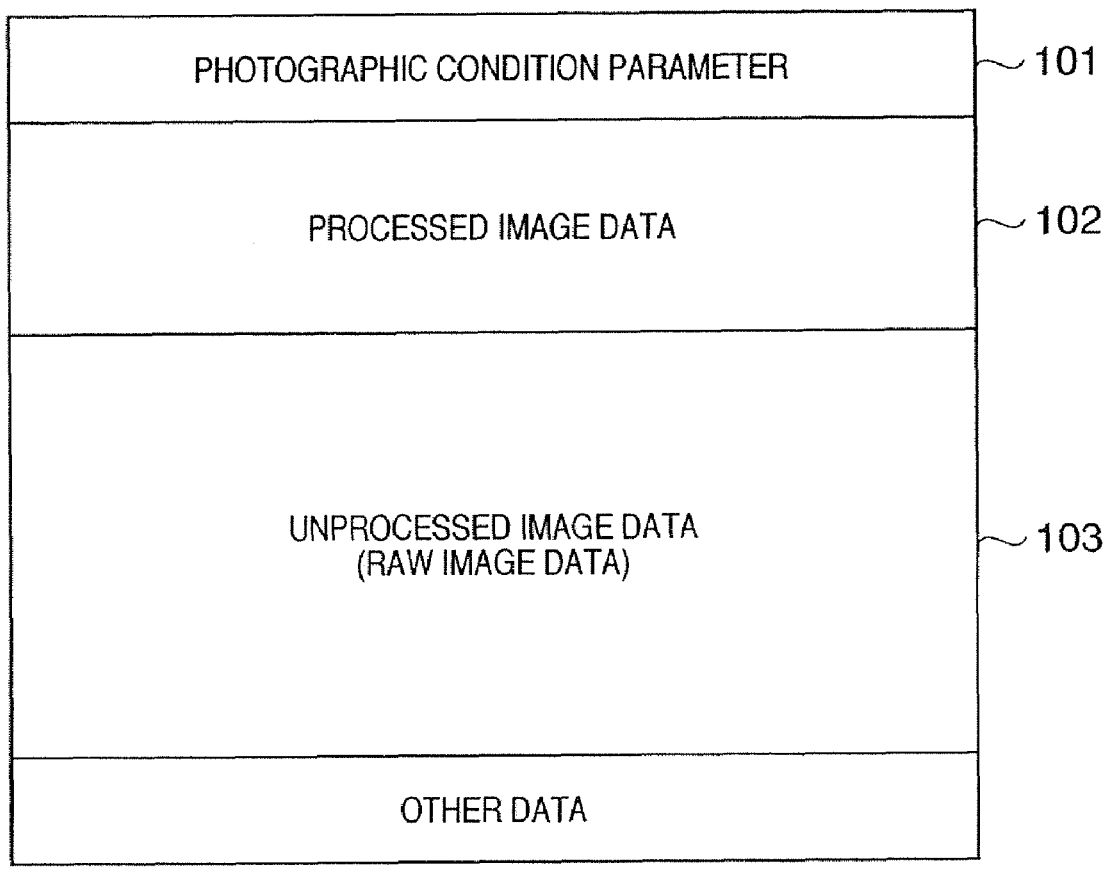
FIG. 1 is a diagram illustrating the data structure within an image file according to an embodiment of the present invention.

FIG. 1 illustrates the data structure of one raw image data file that has been stored on a storage medium used in a digital camera. As illustrated in FIG. 1, an image file is composed of a photographic condition parameter 101, image data 102 that has undergone development processing, raw image data 103 and other data.

It should be noted that a photographic condition (image processing) parameter setting value that has been set beforehand by the user through operation of the user interface of the camera at the time of photography has been stored in the photographic condition parameter 101 within the image file of FIG. 1. Further, the image data 102 that has undergone development processing is JPEG data created at the time of image sensing based upon a photographic condition parameter of image size (e.g., 640 pixels horizontally×480 pixels vertically) smaller than that of the raw image data. In this embodiment, the image data 102 that has undergone development processing is described as being JPEG type data. However, as long as this data is data capable of displaying the fact that development processing based upon photographic conditions has been applied, then the data may just as well be in a bitmap type or GIF type, etc. Further, the raw image data 103 is raw sensor (output) data obtained by applying only an A/D conversion to data that is the result of an opto-electronic conversion by the image sensor (e.g., CCD) of a digital camera. In this embodiment, it is assumed that the size of the raw image data is a pixel size of 2560×1920 (which corresponds to a case where an image has been sensed by a digital camera whose image sensing device has 5,000,000 pixels). Since the raw image data should be completely restorable to the image that prevails after the A/D conversion, it may just as well be reversibly encoded data. In other words, it will suffice if the raw image data is of an image data in which the output of the image sensor has been recorded without being lost, such as data in a stage that results when an image signal that has undergone an A/D conversion has not been subjected to at least white balance processing, data in a stage that results when the A/D-converted signal has not been subjected to color separation processing that separates the signal into luminance and color signals, and data in a stage prior to color interpolation processing of an output signal from a color filter.

Further, so long as the raw image data, photographic condition parameter and image data that has undergone development processing are correlated with one another, the data structure of the file is not limited to the structure shown in FIG. 1.

Figure 2:
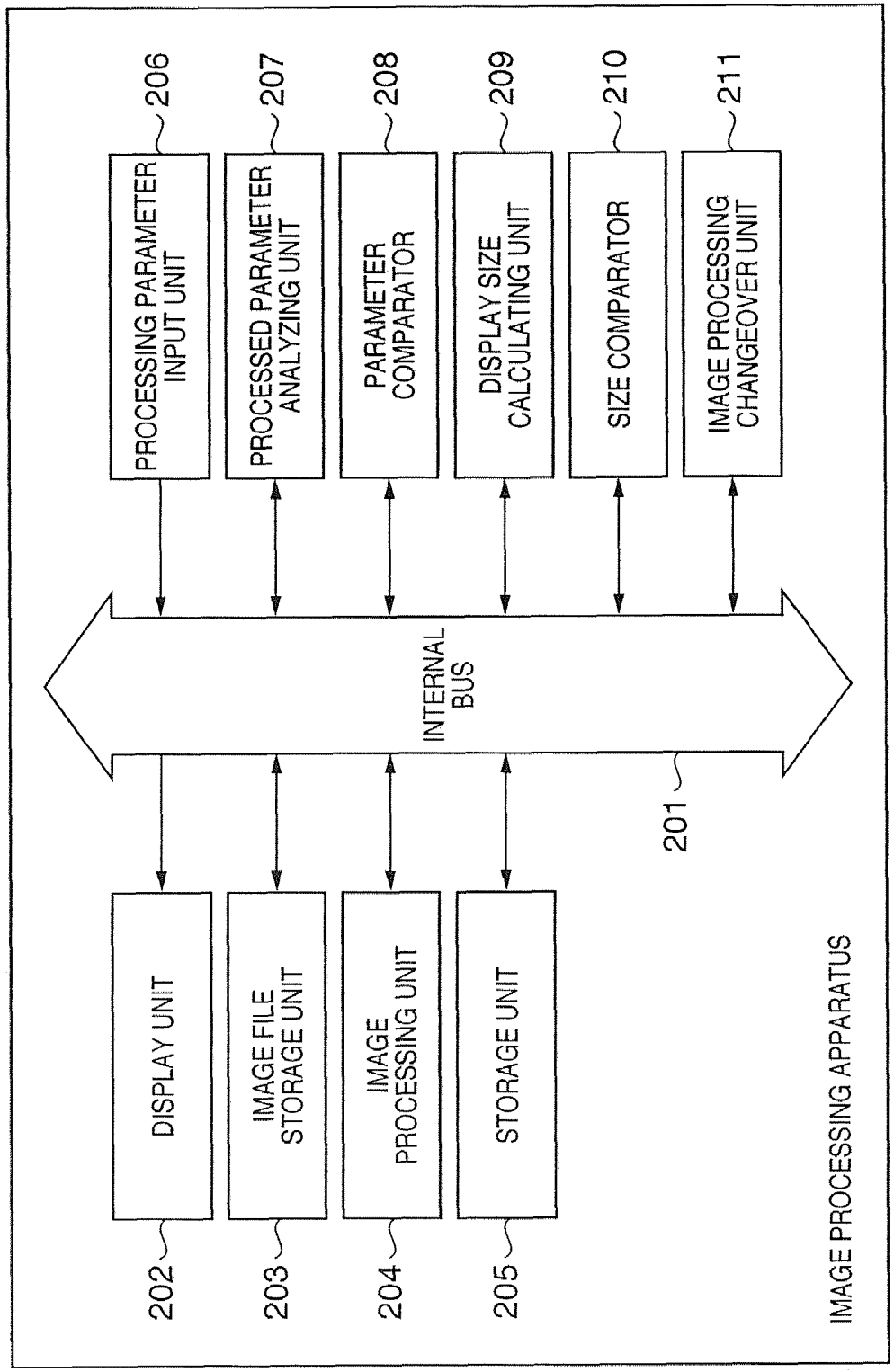
FIG. 2 is a fundamental block diagram of an image processing apparatus according to this embodiment.
Figure 3:
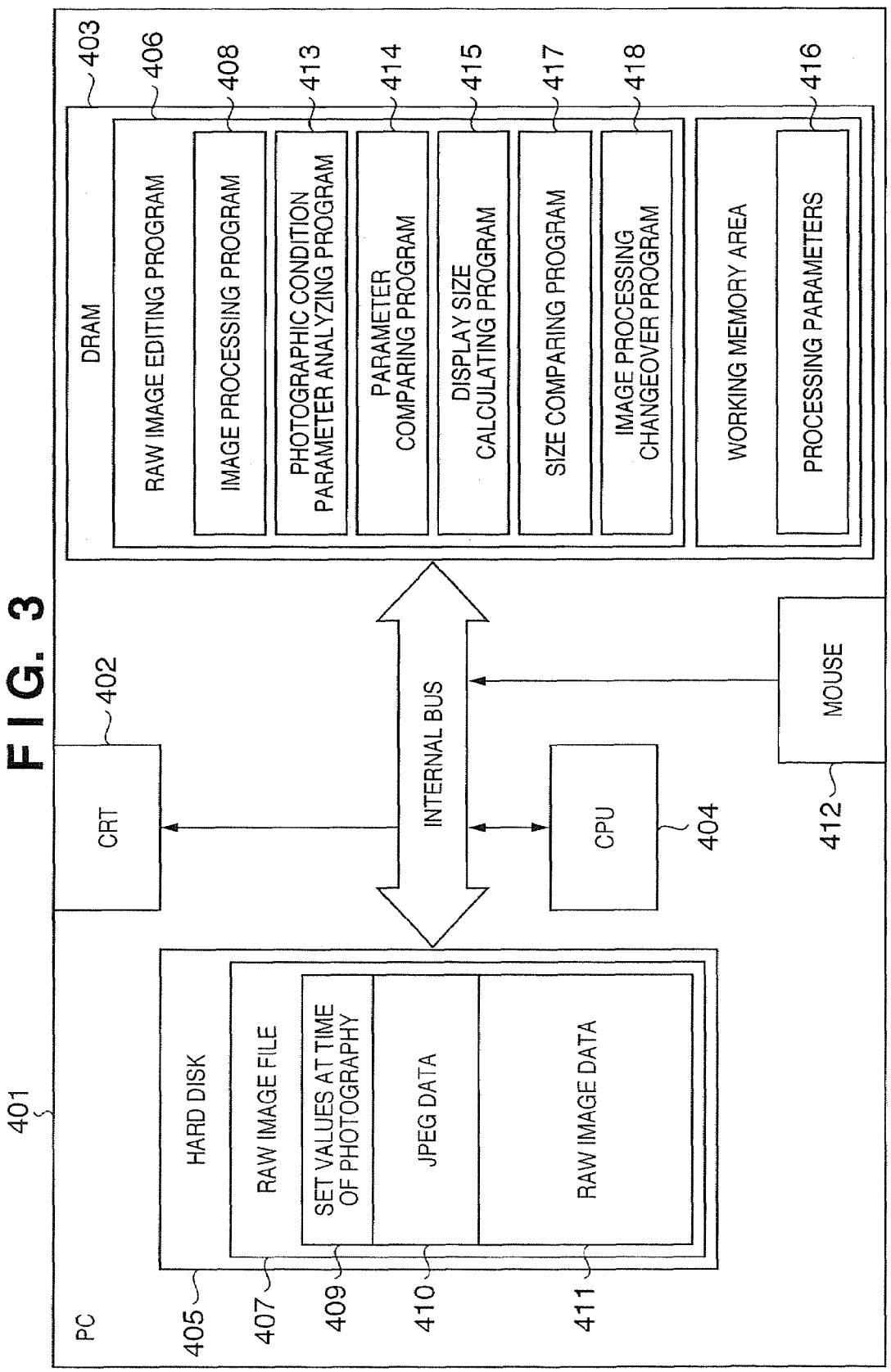
FIG. 3 is a diagram illustrating an arrangement in a case where the image processing apparatus of this embodiment is implemented by a computer program.

FIG. 2 is a fundamental block diagram of the image processing apparatus according to this embodiment. This image processing apparatus is implemented by a general-purpose information processing apparatus such as a personal computer and an application program that runs on the personal computer. The configuration in such case is as illustrated in FIG. 3 and functions as an image processing apparatus by virtue of an image editing program 406 in FIG. 3 and an operating system, which is not shown. The arrangement of FIG. 2 will be described while comparing it with FIG. 3. Furthermore, the image editing program in FIG. 3 has been stored on a hard disk 405 and is capable of being loaded in a DRAM 403 and executed in response to a command from the user to launch the program.

An internal bus 201 is for allowing various processors in the image processing apparatus to send and receive data.

A display unit 202 displays result of image processing that has been applied to raw image data, image data that has undergone development processing and a user interface for allowing the user to enter development parameters. In FIG. 3, a CRT 402 corresponds to the display unit 202.

An image file storage unit 203 stores an image file of the kind shown in FIG. 1. Though one file is illustrated as being stored, it is of course possible to store a number of files. A hard disk device 405 in FIG. 3 corresponds to the image file storage unit 203. Conceivable methods of inputting the file of FIG. 1 from a digital camera and storing it in the image file storage unit include a method of transferring the file to the apparatus upon connecting the digital camera to the apparatus via an interface such as a USB interface with which the camera is usually equipped, and a method of connecting a card reader to the apparatus, inserting into the card reader a storage medium that has been removed from the digital camera, reading the storage medium and transferring the read data to the image file storage unit 203. In a case where the file shown in FIG. 1 exists on a network, the file need only be stored in the image file storage unit 203 via a network interface. In other words, the means for storing the file of FIG. 1 in the image file storage unit 203 may be any means whatsoever.

An image processing unit 204 subjects raw image data to image processing and executes processing for image enlargement and reduction. An image processing program 408 in FIG. 3 corresponds to the image processing unit 204.

A storage unit 205 is utilized as a variety of work areas. A work memory area in DRAM 403 in FIG. 3 corresponds to the storage unit 205.

A development parameter input unit 206 is for inputting a desired parameter believed to be preferable when the user applies image processing to raw image data. The development parameter input unit 206 is implemented by cooperation between a keyboard (not shown) and mouse 412 and a display window (described later) presented at the time of input.

A photographic condition parameter analyzing unit 207 analyzes the image file as shown in FIG. 1 and acquires a photographic condition parameter. A photographic condition parameter analyzing program 413 in FIG. 3 corresponds to the unit 207.

A parameter comparator 208 compares a parameter for image processing that the user has entered by the development parameter input unit 206 and a photographic condition parameter that has been analyzed by the photographic condition parameter analyzing unit 207, thereby detecting matching of set values for every parameter item. In FIG. 3, a parameter comparing program 414 corresponds to the parameter comparator 208.

A display size calculating unit 209 calculates the size of an image to be displayed based upon the present display state of the display unit. A display size calculating program 415 in FIG. 3 corresponds to the display size calculating unit 209.

A size comparator 210 compares the image size to be displayed calculated by the display size calculating unit 209 and the image size of the image data 102 that has undergone development processing. A size comparing program 417 in FIG. 3 corresponds to the size comparator 210.

Based upon the result of the comparison operations by the parameter comparator 208 and size comparator 210, an image processing changeover unit 211 performs changeover control to display the image data 102 that has undergone development processing or the result obtained by applying image processing to the raw image data 103. An image changeover program 418 in FIG. 3 corresponds to the image processing changeover unit 211.

Though the description has been rendered with regard to FIG. 2, each of the partial programs that constitutes the editing program shown in FIG. 3 is executed by a CPU 404.

The processing of the image editing program 406 according to this embodiment will be described next.

Figure 4:
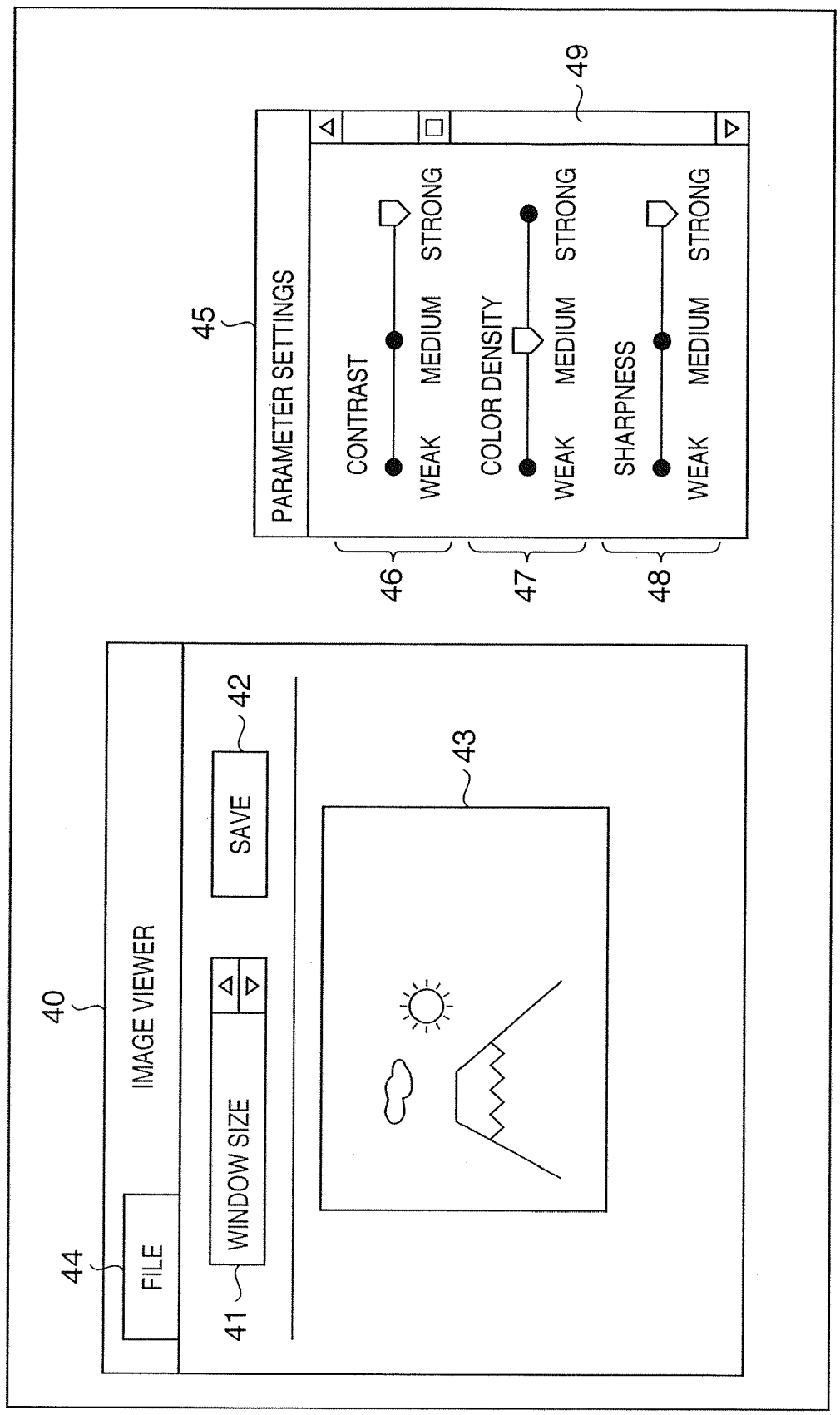
FIG. 4 is a diagram illustrating an example of a user interface relating to editing according to this embodiment.

FIG. 4 illustrates a graphical user interface relating to image editing; it appears when the image editing program 406 of this embodiment is launched. When the editing program of this embodiment is executed, two windows 40 and 45 are displayed on the display screen, as illustrated in FIG. 4.

The window 40, which is primarily for displaying an image undergoing editing, is provided with an image display window 43 (which has a pixel size of 640×480 immediately after launch) for displaying the edited image, a size designating area 41 for designating the window size of the image display window 43, a save button 42 for designating save, and a "FILE" button 44 for displaying a dialog box (not shown) for the purpose of reading in an image file. Up/down arrows are displayed on the right side of the size designating area 41. By moving a cursor operatively associated with the mouse and clicking the arrows, the size of the image display window 43 can be changed. The size of the image display window 43 can also be set to exceed the size of the window 40. If a size that exceeds the size of the window 40 is designated, part of the image display window will be displayed within the window 40 and both horizontal and vertical scroll bars will be displayed. Accordingly, unresized image data that is based upon raw image data, namely the display pixels, and the image to be displayed can be displayed in one-to-one correspondence.

Various image editing items are displayed in the window 45. It is possible to adjust the applicable editing item by moving a slider knob of the desired item. (Though three stages, namely weak, medium and strong, are illustrated in FIG. 4, a greater number of stages may be provided as a matter of course.) In FIG. 4, three controls, namely a contrast control 46, color density control 47 and sharpness control 48 are being displayed as the editing items. By clicking and scrolling a scroll bar 49, however, other setting items (tone curve, brightness, white balance setting, color temperature and hue, etc.) can be displayed. In the state (default) that prevails immediately after the application of this embodiment is launched, the knobs on the slider bars of the editing items are all set to the intermediate positions.

In the description that follows, a status value decided by the knob position on the slider bar of each editing item shall be referred to as an "editing parameter" (or simply a "parameter"), and the operation for changing the knob position to thereby change the state of the editing item shall be referred to as "setting a parameter". Further, in a case where the degree of editing is set, excellent operability is achieved when the slider bars are used as illustrated. However, setting may be performed by inputting numerical values and the form of the display for making these settings may be any form whatsoever. In addition, although the two windows 40 and 45 are displayed, these may just as well be displayed as a single window.

Figure 5:
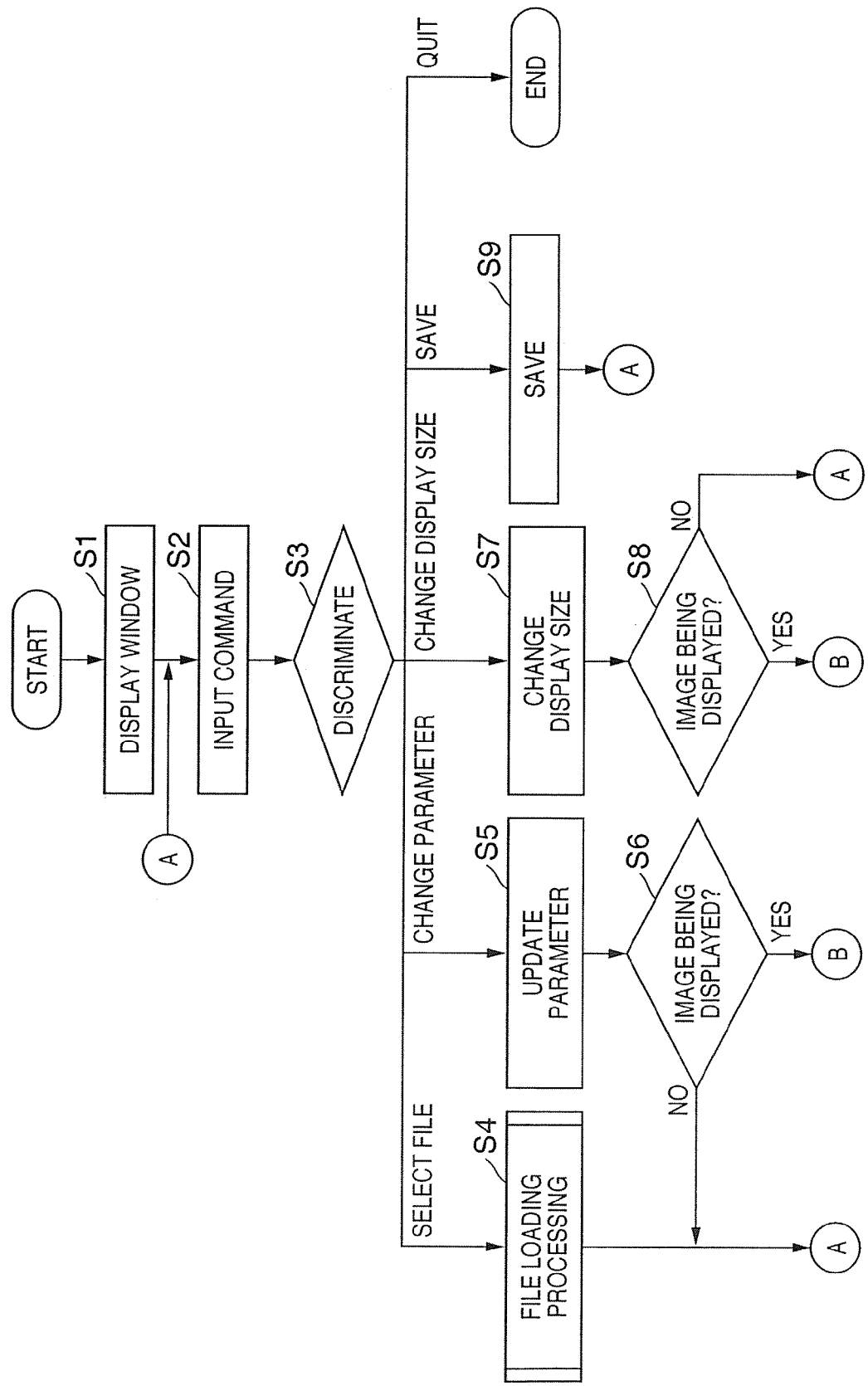
FIGS. 5, 6 and 7 are flowcharts illustrating processing according to this embodiment.

The windows 40 and 45 in FIG. 4 will be adopted as the basic configuration and the associated content of processing will be described in accordance with the flowcharts of FIG. 5 to 7.

When the editing program of this embodiment starts to be executed, the windows 40, 45 shown in FIG. 4 are displayed at step S1. Since an image file to be edited has not yet been selected, no image is displayed in the image display window 43 shown in FIG. 4.

Next, control proceeds to step S2, at which the apparatus waits for entry of a command from the user. The types of command inputs include commands from the size designating area 41, save button 42 and file button 44, changes in the knob positions on the slider bars of the editing items 46 to 48, and a command to quit the application of this embodiment. The save button 42 does not function if an image to be edited is not being displayed.

If there is a command input, the destination of a branch is decided in accordance with the type of command input.

If it is determined that a change in parameter has been commanded (adjustment of the knob position on the slider bar of any editing item in window 45), then control proceeds to step S5, where the result of the change is saved in a processing parameter area 416 (see FIG. 3) within the working memory area. Whether an image is being displayed is determined at step S6. If no image is being displayed, then control returns to step S2.

If it is determined that a command has been entered in the size designating area 41, then control proceeds to step S7, where the size of the image display window 43 is calculated and changed (by the display size calculating program 415) in accordance with the designated size and the result is saved in the processing parameter area 416. Whether an image is being displayed is determined at step S8. If no image is being displayed, then control returns to step S2.

The reason for thus making it possible to set the size of the image display window 43 and the image editing parameter before an image file to be edited is selected is to make possible an initial editing setting when the user selects an image file to be edited and displays it in the image display window 43. If it is determined at steps S6, S8 that an image is being displayed, then it is construed that the setting of the parameter and the designation of change in size are settings that relate to the image being displayed at such time and control proceeds to the processing of FIG. 7, described later. Here we will continue with the description of the processing shown in FIG. 5.

If it is determined that the command entered at step S2 is from the file button 44, then a list of image files stored on the hard disk 405 is displayed. The user selects the desired image file from the list and processing for loading this file in the working memory area of DRAM 403 is executed (step S4).

Further, if the save button 42 is clicked, then processing whereby the image data that has been stored in the working memory area is saved on the hard disk 405 is executed (step S9). When image data is saved, it is possible to save the data upon changing the file name.

Next, the details of file loading processing at step S4 will be described in accordance with the flowchart of FIG. 6. What is noteworthy here is the possibility that the editing parameter and the size of the image display window have been changed from what they were at start-up.

First, at step S11, an image file (the structure of which is shown in FIG. 1) that has been designated by the user is loaded into the working memory area. Control then proceeds to step S12, where the photographic condition parameter contained in the image file that has been read in is analyzed (by the photographic condition parameter analyzing program 413). Since the photographic condition parameter includes data (date of photography, etc.) that is unrelated to image editing, such information is excluded and the status values (referred to as "photographic condition information" below) of each of the items corresponding to the image editing items of this embodiment are read in.

Next, control proceeds to step S13, where the photographic condition information obtained by analysis is compared (by the parameter comparing program 414) with information that has been stored in the processing parameter area 416, namely the parameter set by the user. If even one item to be edited differs, control proceeds to step S16. Here the raw image data that has been loaded in the working memory area is subjected to development processing in accordance with the set parameter and the image display window 43 at this time is resized (these operations on the raw image data will be referred to as "image processing" below). Control then proceeds to step S17, where the result of image processing is displayed in the image display window 43.

If it is determined at step S13 that a photographic condition that has an effect upon editing and a set parameter agree, then control proceeds to step S14. Here it is determined (by the display size calculating program 415) whether the image size of the data that has undergone processing (namely JPEG data) is greater than the present size of the image display window 43. If it is determined that the image size of the processed image data (JPEG data) is greater than the present size of the image display window 43, then this means that an image identical with that processed in accordance with set parameter prevailing at this time exists as JPEG image data and that it will suffice if at least the image data that has undergone processing is not enlarged. Control therefore proceeds to step S15, where the processed image data that has been loaded in the working memory area is displayed in the image display window 43. If the size of the image display window 43 is smaller than the image size of the JPEG image at this time, then size-reduction processing is executed.

If the size (numbers of pixels in the horizontal and vertical directions) of the image display window 43 is larger than the image size of the JPEG image, then, even if there is a match between the photographic condition and the set parameter, control proceeds to step S16 for the purpose of applying image processing based upon the raw image data.

Image processing (the development processing executed by the image processing program 408) is applied to the raw image data is executed at step S16. This is processing that subjects the CPU to a heavy load and a certain amount of time is required for the image to be displayed. When control shifts to step S16, therefore, a bar display indicating elapsed processing time and the status of progress is displayed on or outside the window of FIG. 4. This enhances usability in that the user is capable of checking the status of processing.

Further, it may be so arranged that the shape of the cursor operatively associated with the mouse 412 is changed from the usual arrow shape to the shape of an analog clock, by way of example. Since development processing at this time requires processing commensurate with the number of items set, it is so arranged that the status of progress is displayed in the form of the second hand of the analog clock. When development processing is completed and the result thereof is displayed in the image display window 43, the shape of the cursor changes back to the usual shape. If control has proceeded to step S15, on the other hand, the image is displayed based upon the data that has undergone processing (the JPEG data). However, since this processing is very simple and the time required for its execution is so short as to be imperceptible, the shape of the cursor displayed is left as usual.

If the result of the foregoing is that the set parameter relating to image editing and the photographic condition information match and, moreover, that the image size of the JPEG data is greater than the display size, then development processing, which is processing that is complicated, is omitted and, hence, it is possible to shorten the time required for the image to be displayed. Further, if the set parameter relating to image editing and the photographic condition information do not match, or if they match but the size of the image display window 43 exceeds the image size of the JPEG data, then development processing is executed in accordance with the set parameter prevailing at this time. When resize processing is necessary but an image file has been selected, it is possible to display the edited image based upon the conditions desired by the user.

According to the description rendered above, it is determined at step S14 whether the image size of the JPEG data is greater than the size of the image display window 43. However, even if the size of the image display window 43 is 1.5 times the image size of the JPEG data (which means 1.5 times the size in both the horizontal and vertical directions), there may be users who place greater emphasis on response so long as the influence on image quality is within allowable limits. In other words, there is a trade-off relationship between whether to give precedence to the image quality of the displayed image or to speed, and whichever is desired depends upon the user. Accordingly, the threshold value used at step S14 may just as well be made fixed by the program or made variable so that it can be set by the user.

Thus, an image to be edited is displayed in the image display window 43. Reference will be had to the flowchart of FIG. 7 to describe processing in a case where the size of the image display window 43 has been changed during this display of the image and in a case where the parameter of an editing item has been changed during this display of the image (namely processing in a case where a "YES" decision has been rendered at step S8 and at step S6 in FIG. 5). It should be noted that the latest parameter and the size of the image display window 43 will have already been decided at this time.

Figure 6:
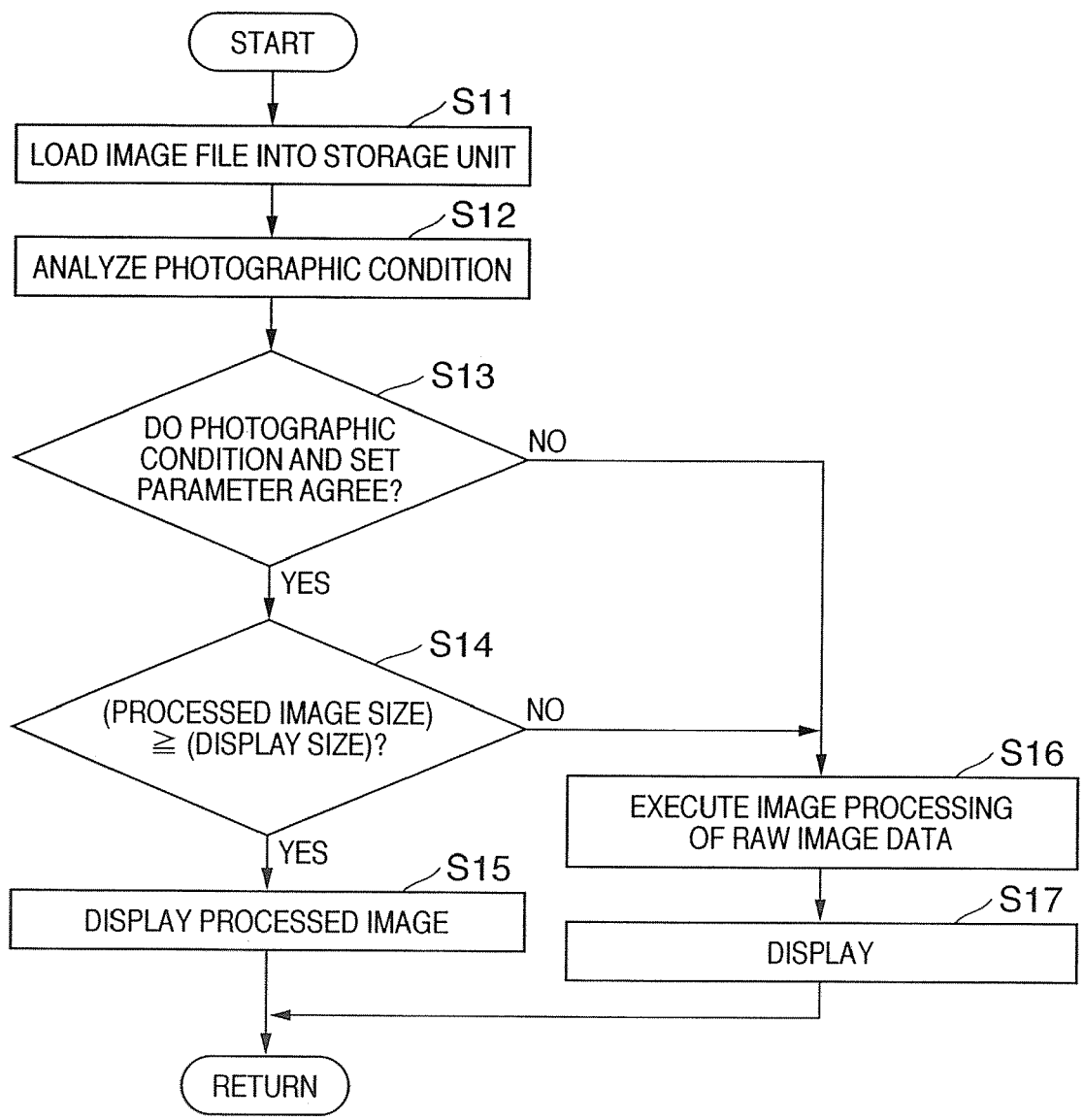
Figure 7:
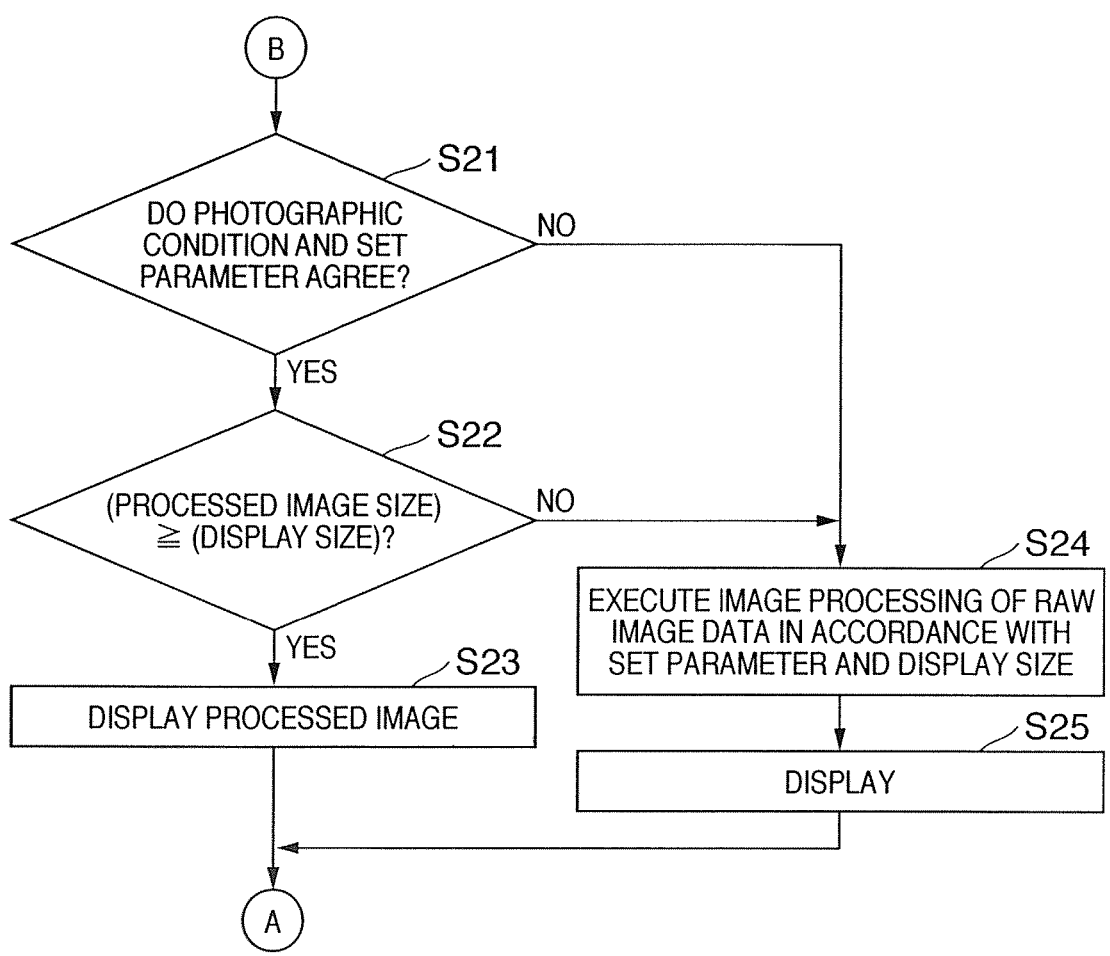

First, at step S21 in FIG. 7, the photographic condition data and set parameter are compared. If it is determined that the two do not agree, control proceeds to step S24, where edit processing is executed in accordance with the set parameter prevailing at this time. Resize processing is also executed in accordance with the size of the image display window at this time. The result of processing is displayed in the image display window 43 at step S25. Since the processing of step S24 is identical with that of step S16 in FIG. 6 described earlier, the above-mentioned bar display and the change in the cursor shape are performed until the image that is the result of processing is displayed.

Further, if it is determined at step S21 that the photographic condition data and set parameter agree, control proceeds to step S22, where it is determined whether the size of the processed image data is greater than the size of the image display window 43. If a "YES" decision is rendered, control proceeds to step S23, where the processed image data (JPEG image data) is resized as necessary and displayed in the image display window 43.

If a "NO" decision is rendered at step S22, then processing from step S24 onward is executed.

If each type of editing parameter is set in a state in which an image to be edited is displayed, then it becomes possible to edit the image based upon parameter that has been set. In addition, in a case where the set parameter and the size of the image display window 43 can be dealt with using image data that has been processed (JPEG data), a high response is obtained by displaying this processed image data.

Furthermore, in a case where development processing has been applied to raw image data, the result is saved in a working memory area. Strictly speaking, the raw image data vanishes at this time but in this embodiment data that has undergone development processing also is referred to as raw image data for the sake of convenience. Accordingly, if the size of the image display window 43 is changed after a parameter is changed and development processing applied to raw image data, it will suffice to execute only resize processing for the display and not execute development processing.

Further, in this embodiment, it is determined whether a photographic condition and the parameter of each item to undergo editing match or not. However, in case of the setting item "SHARPNESS", for example, the influence on sharpness is difficult to perceive if the size of the image display window 43 is small in comparison with the size possessed originally by the image that is based upon the raw image data. Accordingly, a parameter item such as sharpness that is difficult to perceive may just as well be excluded from the matching determination step except in a case where the image is displayed without being resized (i.e., a case where the size of the image display window 43 is made to agree with the number of pixels of resolution possessed originally by the raw image data). As a result, if the size of the image display window 43 is smaller than the original image size, such processing as sharpness processing during development processing can be eliminated. Response, therefore, can be improved correspondingly. Such processing preferable is executed in similar fashion also in a second embodiment described below.

Second Embodiment

In the first embodiment set forth above, an example in which the entirety of an image is displayed in the image display window 43 is described. In certain cases, however, the user may wish to check part of an image in detail when a development parameter is set. In order to achieve this, an arrangement for setting an enlargement rate of the image displayed in the image display window 43 and display processing conforming to the enlargement rate are required.

Figure 8:
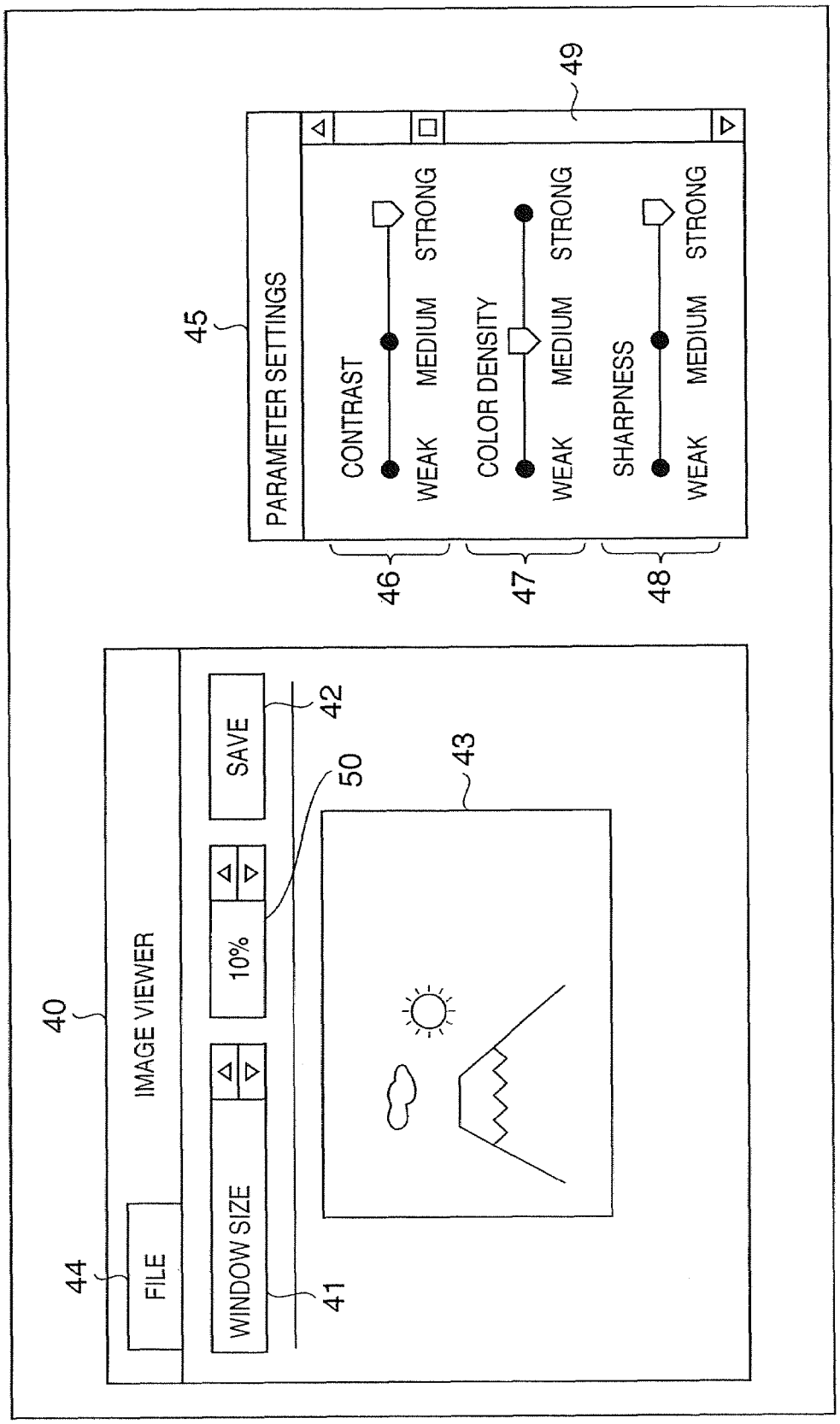
FIG. 8 is a diagram illustrating an example of a user interface relating to editing according to a second embodiment.

FIG. 8 illustrates a graphical user interface relating to image editing when the image editing program 406 is launched in the second embodiment. A magnification designating area 50 for designating magnification is provided and has two triangle marks on its right side. Clicking these marks makes it possible to raise or lower the magnification. Other aspects of this interface are the same as those of the first embodiment and need not be described again. In the second embodiment, only part of an image will displayed in the image display window 43, depending upon the magnification set. However, by moving a cursor within the image display window 43 and performing a dragging operation, it is possible to display other parts of the image by scrolling. It should be noted that the scroll processing is not limited to that described. It is of course permissible to display scroll bars at the periphery of the image display window 43 and operate the scroll bars to achieve the above effects.

An overview of the present invention will be described first.

By way of example, assume that the size of the image display window 43 is 320 pixels horizontally and 240 pixels vertically (this will be expressed as a "320×200 pixel size" below), that the size of the JPEG image data is a 640×480 pixel size, and that the size of the raw image is a 3200×2400 pixel size.

Further, when the magnification designated by the magnification designating area 50 is 100%, this means that one display pixel in the image display window 43 has 1:1 correspondence with one pixel of the raw image. When the designated magnification is 20%, this means that one display pixel corresponds to 5×5 pixels of the raw image.

Consider a case where the sizes of the image display window 43, JPEG image and raw image have been set provisionally to a magnification of 40% by the operator using the magnification designating area 50 under the conditions set forth above.

The size of the raw image data at a magnification of 40% is a 1280×960 pixel size. This size will exceed the bounds of the image display window 43. Accordingly, part of the scaled image will be displayed in the image display window 43.

Since the 1280×960 pixel size obtained by scaling now exceeds the size of the JPEG image, the image displayed in the image display window 43 can only be created by subjecting the raw image data to development processing.

If the magnification is made 20%, on the other hand, the size of the raw image data at the magnification of 20% will be a 640×480 pixel size and therefore this is exactly the same as the JPEG image size. Accordingly, if the development parameter that has been set by the operator and the parameter prevailing at the time of photography are the same and, moreover, the magnification is 20%, then it will suffice to cut an area having the same size as that of the image display window 43 from within the JPEG image data and display this area in the image display window. If the development parameter that has been set by the operator and the parameter prevailing at the time of photography are the same and, moreover, the magnification is less than 20%, then it will suffice to display the JPEG image upon downsampling it.

The foregoing may be summarized as set forth below. First, variables are defined (where the units are pixels in each case).

Xj: size of the JPEG image in the horizontal direction;
Yj: size of the JPEG image in the vertical direction;
Xr: size of the RAW image in the horizontal direction;
Yr: size of the RAW image in the vertical direction; and
M: the set magnification (%).

In the definitions above, the requirements that enable a JPEG image to be utilized as an image displayed in the image display window 43 are as follows:

$$Xj \geq Xr \times M/100$$

$$Yj \geq Yr \times M/100 \qquad (1)$$

Considering Equation (1) with regard to the magnification M, we have the following:

$$M \leq Xj/Xr \times 100$$

$$M \leq Yj/Yr \times 100$$

More specifically, if the magnification M set by the operator is less than "Xj/Xr×100", this means that a JPEG image can be utilized as the image displayed in the image display window 43. In terms of the requirements above, a JPEG image can be utilized if M≦20% holds.

Magnification M' with respect to a JPEG image in a case where it has been determined that the JPEG image can be utilized can be found as follows:

$$M' = M \times Xr/Xj \text{ or } M' = M \times Yr/Yj$$

In other words, in a case where the magnification set by the operator is 10%, the magnification M' to the JPEG image is as follows:

$$M' = 10 \times 3200/640 = 50\%$$

Thus it will suffice to make the JPEG image 50% (=0.5 times) and display it in the image display window 43.

In the description above, even though the size of the image display window 43 is capable of being changed, Xr×M/100 in the horizontal direction and Yr×M/100 in the vertical direction thereof will not be exceeded.

Figure 9:
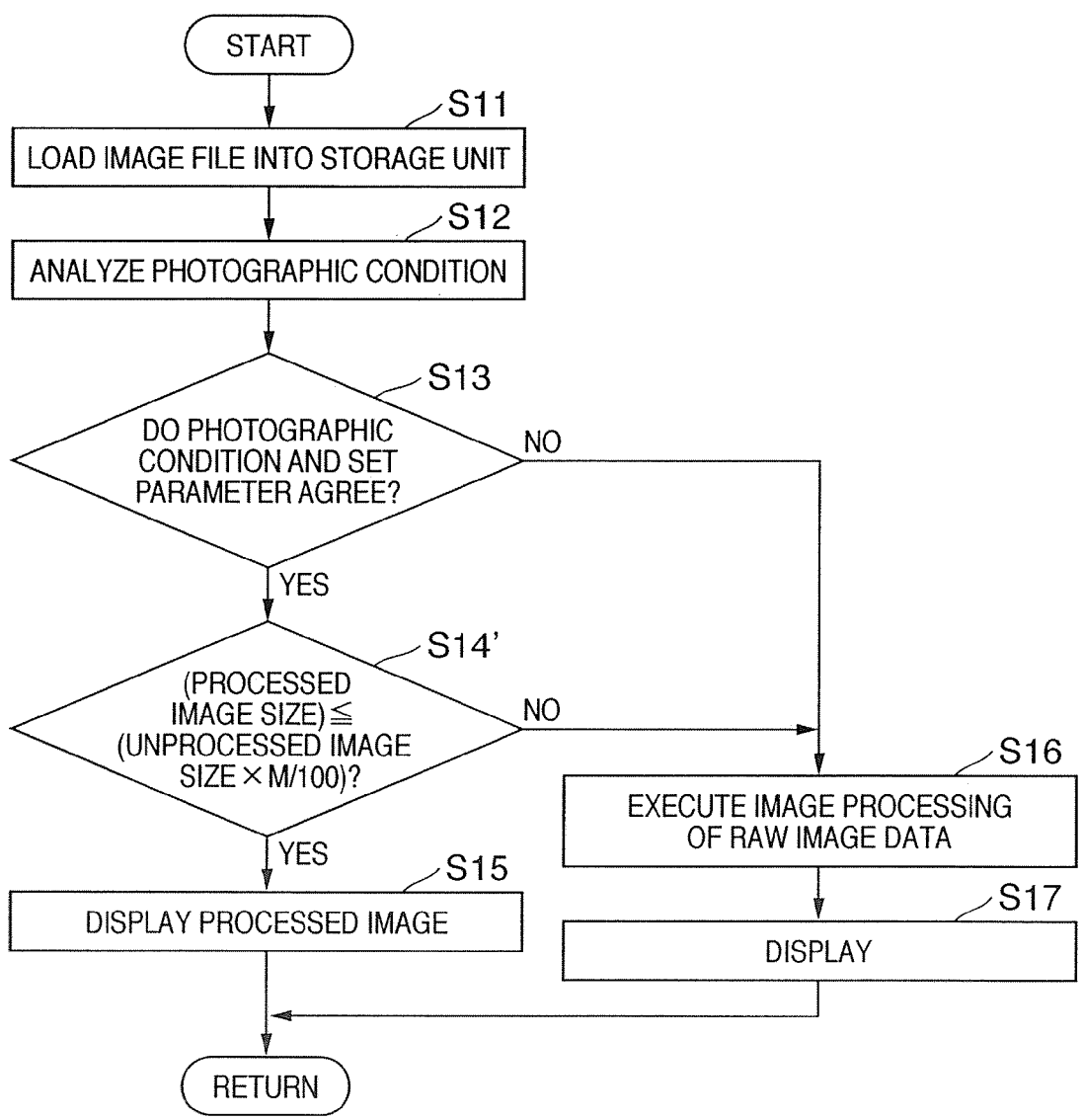
FIGS. 9 and 10 are flowcharts illustrating processing according to the second embodiment.
Figure 10:
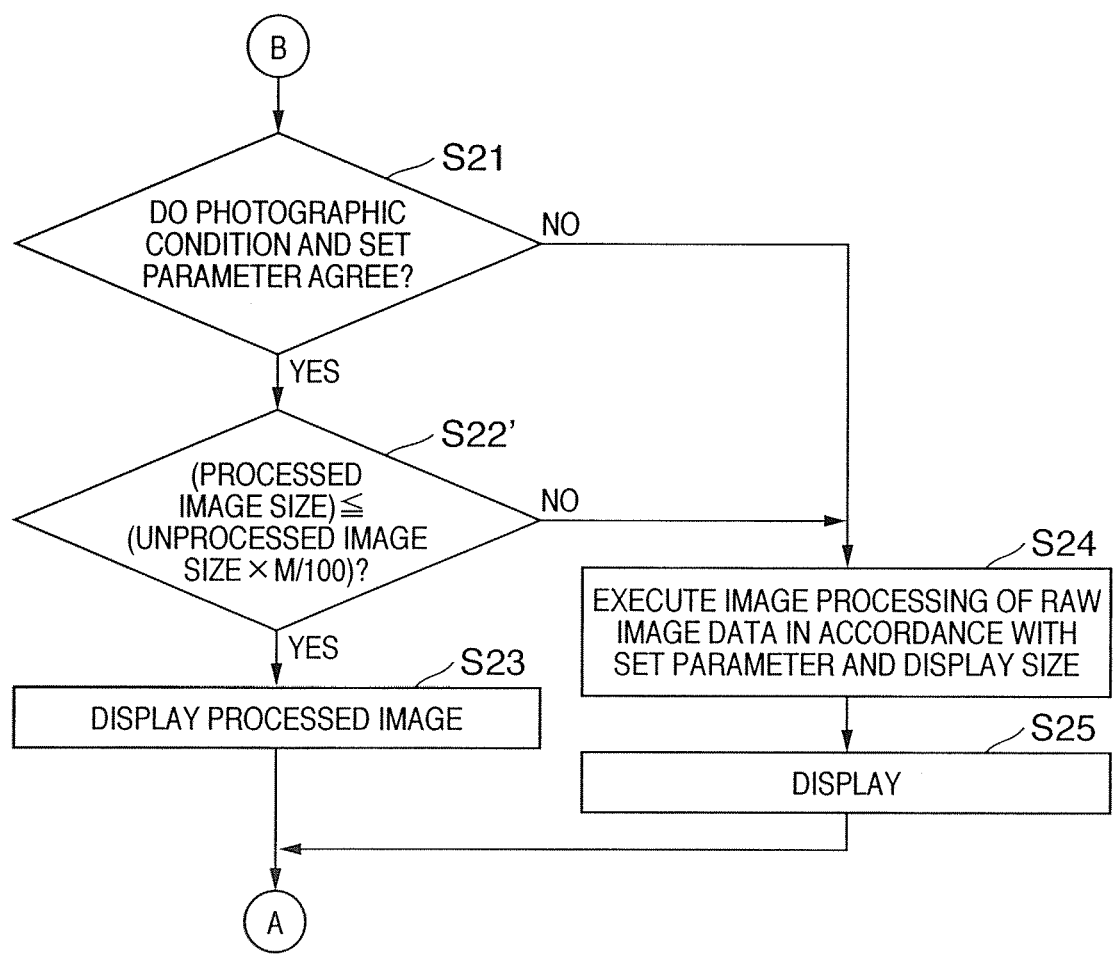

In a case where the second embodiment is implemented, the processing of FIGS. 9 and 10 should be executed instead of the processing of FIGS. 6 and 7. FIGS. 9 and 10 differ from FIGS. 6 and 7 only in steps S14' and S22' and are identical with FIGS. 6 and 7 in other respects.

At steps S14' and S22', it is determined whether the size of the image data that has undergone processing (the size of the JPEG image) is greater than M% of the raw image size. If the decision rendered is "YES", then the processing of step S15 or S23 is executed.

Though described also in the first embodiment, there may be users who place emphasis on high response even if the image displayed in the image display window 43 is somewhat affected. It will therefore suffice to adapt steps S14', S22' such that a coefficient α (α≧1) that can be set by the user is defined and the following equation is obtained:

$$Xj \times \alpha \geq Xr \times M/100$$

$$Yj \times \alpha \geq Yr \times M/100 \qquad (1')$$

Further, in the first and second embodiments, if each editing parameter is changed and no longer agrees with the photographic condition information, image processing (development processing) that is based upon raw image data is executed, the user selects the saving type to be the JPEG type or bitmap type, etc., and based upon the parameter that has been set by the user, the image is saved as a separate file in association with this set parameter as an image that has undergone development processing.

Further, in accordance with the first and second embodiments, if the set parameter of a certain image has been clicked and editing that satisfies the user performed, then, when the next image file is written in, it is possible to display a processed result in a state that reflects the former parameter. When the image of a subject is sensed multiple times by a digital still camera, often the photographic conditions of the sensed images are made the same. It is therefore possible to perform editing efficiently.

As will be evident from the description of the above embodiment, the present invention can be implemented by an application program that runs on a general-purpose information processing apparatus such as a personal computer, and therefore the scope of the present invention also covers a computer program. Further, a computer program usually is stored on a computer-readable storage medium such as a CD-ROM, the medium is inserted into a computer and the program can be executed upon being copied to or installed in the system. Accordingly, it is obvious that such a computer-readable storage medium also falls within the scope of the present invention.

Thus, in accordance with the present invention, as described above, an image that conforms to an editing parameter set by the user is displayed. In addition, depending upon the editing parameter requested, the time required until the image is displayed can be shortened and usability enhanced.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2004-031402 filed on Feb. 6, 2004 and 2005-000909 filed on Jan. 5, 2005, which are hereby incorporated by reference herein.

What is claimed is:

1. An image processing apparatus for editing an image file comprising at least photographic condition information, processed image information that has undergone image processing in accordance with photographic conditions, and unprocessed image information that has not undergone said image processing, said apparatus comprising:

a setting unit which sets an editing parameter relating to image processing;

a comparison unit which compares the editing parameter set by said setting unit and a corresponding parameter in the photographic condition information within the image file to provide an output when the image file that has been stored in a predetermined storage device and is to be edited is displayed in accordance with the editing parameter that has been set by said setting unit; and a display control unit which displays, on a predetermined display unit, an image that is based upon the processed image information within the image file to be edited if the parameters compared by said comparison unit match, and displays, on the predetermined display unit, an image obtained by applying the processing to the unprocessed image information within the image file to be edited in accordance with the editing parameter set by said setting unit if the parameters compared by said comparison unit do not match.

2. The apparatus according to claim 1, wherein said display control unit operates when a desired image file that has been stored in the predetermined storage device and is to be edited is decided.

3. The apparatus according to claim 1, wherein said display control unit operates when a parameter is changed by said setting unit with respect to an image being displayed on said display unit.

4. The apparatus according to claim 1, further comprising:
   a display area size designating unit which designates a display area size in which an image is displayed; and
   an item deciding unit configured to decide an edit item to be compared with the photographic condition information and an edit item not to be compared with the photographic condition information, in dependence upon the size of a display area that has been designated by said display area size designating unit.

5. The apparatus according to claim 4, wherein said item deciding unit decides upon sharpness as an item to be subjected to image processing, in dependence upon the size of a display area that has been designated by said display area size designating unit.

6. The apparatus according to claim 4, wherein said display control unit:
   resizes an image, which is based upon the processed image information within the image file to be edited, to the display area size that has been designated by said display area size designating unit, and displays the resized image on the predetermined display unit, if an editing parameter that has been set and a corresponding parameter in the photographic condition information possessed by the image file to be edited coincide by said comparison unit and, moreover, if a size relationship between the image size of the processed image information within the image file to be edited and the display area size that has been designated by said display area size designating unit satisfies a predetermined requirement; and
   resizes an image, which has been obtained by subjecting the unprocessed image information within the image file to be edited to image processing in accordance with the parameter set by said setting unit, to a display area size that has been designated by said display area size designating unit, and displays the resized image on the predetermined display unit if said parameters do not match as compared by said comparison unit or if said parameters match but said predetermined requirement is not satisfied.

7. The apparatus according to claim 6, further comprising a unit configured to change the requirement satisfied by the size relationship.

8. The apparatus according to claim 1, wherein said display control unit includes a notification unit which gives notice of the fact that processing will take a unit of time measured from an instant at which it is decided to display on the predetermined display unit the image based upon the unprocessed image information within the image file to be edited, to an instant at which the image is displayed.

9. The apparatus according to claim 8, wherein said notification unit gives said notification by presenting a bar display that indicates status of progress of said processing.

10. The apparatus according to claim 8, wherein said notification unit gives said notification by changing a shape of a cursor, which is operatively associated with a prescribed pointing device, to a prescribed shape.

11. The apparatus according to claim 1, further comprising a magnification setting unit which sets a magnification when an image is displayed;
   wherein if an editing parameter that has been set and a corresponding parameter in the photographic condition information possessed by the image file to be edited coincide by said comparison unit and, moreover, if a size relationship between the image size of the processed image information within the image file to be edited and size of the image that prevails when the unprocessed image data has been scaled at the magnification set by said magnification setting unit satisfies a predetermined requirement, then an image, which is based upon the processed image information within the image file to be edited, is resized at the set magnification and displayed on the predetermined display unit; and
   if said parameters do not match as compared by said comparison unit or if said parameters match but said predetermined requirement is not satisfied, then an image, which has been obtained by subjecting the unprocessed image information within the image file to be edited to image processing in accordance with the parameter set by said setting unit, is resized to a display area size that has been designated by said display area size designating unit and displayed on the predetermined display unit.

12. The apparatus according to claim 1, wherein the processed image data is image data compressed irreversibly and the unprocessed image information is image data compressed reversibly.

13. The apparatus according to claim 1, wherein the processed image data has a JPEG format and the unprocessed image information has a RAW format.

14. The apparatus according to claim 1, wherein the photographic condition information is setting a parameter of image processing specified in a camera.

15. The apparatus according to claim 1, further comprises a saving which saves the processing set by user as photographic condition information.

16. A method of controlling an image processing apparatus for editing an image file comprising at least photographic condition information, processed image information that has undergone image processing in accordance with photographic conditions and unprocessed image information that has not undergone said image processing, said method comprising:
   a setting step which sets an editing parameter relating to Image processing;
   a comparison step which compares the editing parameter set at said setting step and a corresponding parameter in the photographic condition information within the image file to provide an output when the image file that has been stored in a predetermined storage device and is to be edited is displayed in accordance with the editing parameter that has been set at said setting step; and
   a display control step which displays, on a predetermined display unit, an image that is based upon the processed image information within the image file to be edited if the parameters compared at said comparison step match, and displays, on the predetermined display unit, an image obtained by subjecting the unprocessed image information within the image file to be edited in accordance with the editing parameter set at said setting step if the parameters do not match.

17. A computer-readable storage medium encoded with a computer program that enables a computer to function as an image processing apparatus for editing an image file comprising at least photographic condition information, processed image information that has undergone image processing in accordance with photographic conditions and unprocessed image information that has not undergone said image processing, said apparatus comprising:

setting means which sets an editing parameter relating to image processing;

comparison means which compares the editing parameter set by said setting means and a corresponding parameter in the photographic condition information within the image file to provide an output when the image file that has been stored in a predetermined storage device and is to be edited is displayed in accordance with the editing parameter that has been set by said setting means; and display control means which displays, on predetermined prescribed display means, an image that is based upon the processed image information within the image file to be edited if the parameters compared by said comparison means match, and displays, on said display means, an image obtained by applying the image processing to the unprocessed image information within the image file to be edited in accordance with the editing parameter set by said setting means if the parameters do not match.

* * * * *